United States Patent
Clark et al.

(10) Patent No.: US 10,540,411 B2
(45) Date of Patent: Jan. 21, 2020

(54) CANDIDATE ANSWERS FOR SPECULATIVE QUESTIONS IN A DEEP QUESTION ANSWERING SYSTEM

(71) Applicant: International Business Machines Corporation, Armonk, NY (US)

(72) Inventors: Adam T. Clark, Mantorville, MN (US); Jeffrey K. Huebert, Rochester, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 14/296,715

(22) Filed: Jun. 5, 2014

(65) Prior Publication Data

US 2015/0227520 A1 Aug. 13, 2015

Related U.S. Application Data

(63) Continuation of application No. 14/177,624, filed on Feb. 11, 2014.

(51) Int. Cl.
| | |
|---|---|
| G06N 3/08 | (2006.01) |
| G06F 16/9535 | (2019.01) |
| G06N 5/04 | (2006.01) |
| G06F 16/33 | (2019.01) |
| G06N 20/00 | (2019.01) |

(52) U.S. Cl.
CPC ........ *G06F 16/9535* (2019.01); *G06F 16/334* (2019.01); *G06N 5/04* (2013.01); *G06N 20/00* (2019.01); *G06N 3/08* (2013.01)

(58) Field of Classification Search
None
See application file for complete search history.

(56) References Cited

U.S. PATENT DOCUMENTS

| | | |
|---|---|---|
| 6,850,812 B2 | 2/2005 | Dinauer et al. |
| 8,285,619 B2 | 10/2012 | Herz et al. |
| 2012/0078889 A1 | 3/2012 | Chu-Carroll et al. |

OTHER PUBLICATIONS

Gilbert, et al., How to Build and Use Agent-Based Models in Social Science, Mind & Society, Mar. 2000, vol. 1, Issue 1, pp. 57-72.*
Wang, et al., Structural Topic Model for Latent Topical Structure Analysis, Proceedings of the 49th Annual Meeting of the Association for Computational Linguistics, 2011, pp. 1526-1535.*
Cox, Introspective Multistrategy Learning: Constructing a Learning Strategy under Reasoning Failure, Tech. Rep. No. GIT-CC-96-06, Doctoral Thesis, Georgia Institute of Technology (1996) pp. 1-471 (Year: 1996).*

(Continued)

*Primary Examiner* — Wilbert L Starks
(74) *Attorney, Agent, or Firm* — Patterson + Sheridan, LLP

(57) ABSTRACT

System, method, and computer program product to determine that a question received by a deep question answering system is speculative, generate, by one or more predictive algorithms, a set of candidate answers, compute a score for each candidate answer in the set of candidate answers, and return a first candidate answer, of the set of candidate answers, as responsive to the speculative question received by the deep question answering system.

10 Claims, 5 Drawing Sheets

(56) References Cited

OTHER PUBLICATIONS

Wang, et al., Structural Topic Model for Latent Topical Structure Analysis, Proceedings of the 49th Annual Meeting of the Association for Computational Linguistics, 2011, pp. 1526-1535 (Year: 2011).*

U.S. Appl. No. 14/177,624, entitled "Candidate Answers for Speculative Questions in a Deep Question Answering System", filed Feb. 11, 2014.

Banerjee, Language Modeling Approaches to Question Answering, Doctoral Thesis, Drexel University, Jul. 2009, pp. 1-219.

Sinha, Answering Questions about Complex Events, Doctoral Thesis, University of California, Berkeley, 2008, pp. 1-205.

Moncecchi, Recognizing Speculative Language in Research Texts, Doctoral Thesis, University of Paris, 2013, pp. 1-160.

* cited by examiner

1

CANDIDATE ANSWERS FOR SPECULATIVE QUESTIONS IN A DEEP QUESTION ANSWERING SYSTEM

CROSS-REFERENCE TO RELATED APPLICATIONS

This application is a continuation of co-pending U.S. patent application Ser. No. 14/177,624, filed Feb. 11, 2014. The aforementioned related patent application is herein incorporated by reference in its entirety.

BACKGROUND

The present disclosure relates to computer software, and more specifically, to computer software to dynamically generate candidate answers for speculative questions in a deep question answering system.

Deep question answering systems answer questions by finding and evaluating candidate answers and supporting evidence from a corpus of ingested information. However, deep question answering systems traditionally assume that answers and supporting evidence will exist in a known corpus. Therefore, deep question answering systems traditionally cannot answer "speculative" questions, i.e., those questions that do not have an associated "answer" within the corpus.

SUMMARY

Embodiments disclosed herein include, without limitation, a system, method, and computer program product to determine that a question received by a deep question answering system is speculative, generate, by one or more predictive algorithms, a set of candidate answers, compute a score for each candidate answer in the set of candidate answers, and return a first candidate answer, of the set of candidate answers, as responsive to the speculative question received by the deep question answering system.

DETAILED DESCRIPTION

Embodiments disclosed herein provide techniques to allow deep question answering (deep QA) systems to answer "speculative" questions asked by users. As used herein, a "speculative" question refers to a question that, at the time presented by the user, does not have a definite answer. Examples of speculative questions include, without limitation, the price of an item (such as a commodity or precious metal) in the future (in two days, three weeks, four months, etc.), the winner of a future sporting event, or which student will win the annual spelling bee at the local school.

In order to generate answers to speculative questions, the deep question answering system may be configured to determine that the question is in fact speculative. Generally, the deep QA system many analyze the question text in order to detect a future tense or includes a concept (such as time) that is indicative of a speculative question. Upon determining that the question is speculative, the deep QA system may then generate new candidate answers based on insights gleaned from an analysis of the speculative question and any associated evidence gathered from a corpus of information. Once the candidate answers are generated, the deep QA system may then score each candidate answer, and return the candidate answer with the highest score as being responsive to the question.

Additionally, the deep QA system may subsequently evaluate the accuracy of each candidate answer and improve scoring algorithms after the question is no longer speculative, i.e., when an answer to the question is known. When processing the speculative question, the deep QA system may store a trigger which causes the actual answer/outcome to be determined in the future, and compared against each candidate answer. For example, if the speculative question is "what will the price of corn be in 2 months," the deep QA system may set a trigger to fire in 2 months, at which point the deep QA system may retrieve the actual price of corn. The deep QA system may then compare the actual price of corn to each candidate answer generated (and stored for future retrieval) at processing time. The trigger may be based on an elapsed period of time, or other criteria derived from the question, such as the performance or price of an entity. The actual result/answer may be fed back into the deep QA system in order to further improve the accuracy of the deep QA system as well as any predictive models used to generate the candidate answers.

The deep QA system may determine that the question is speculative by combining traditional question analysis (including concept and semantic relation detection) along with verb tense annotators to identify a future tense in the question.

Figure 1:
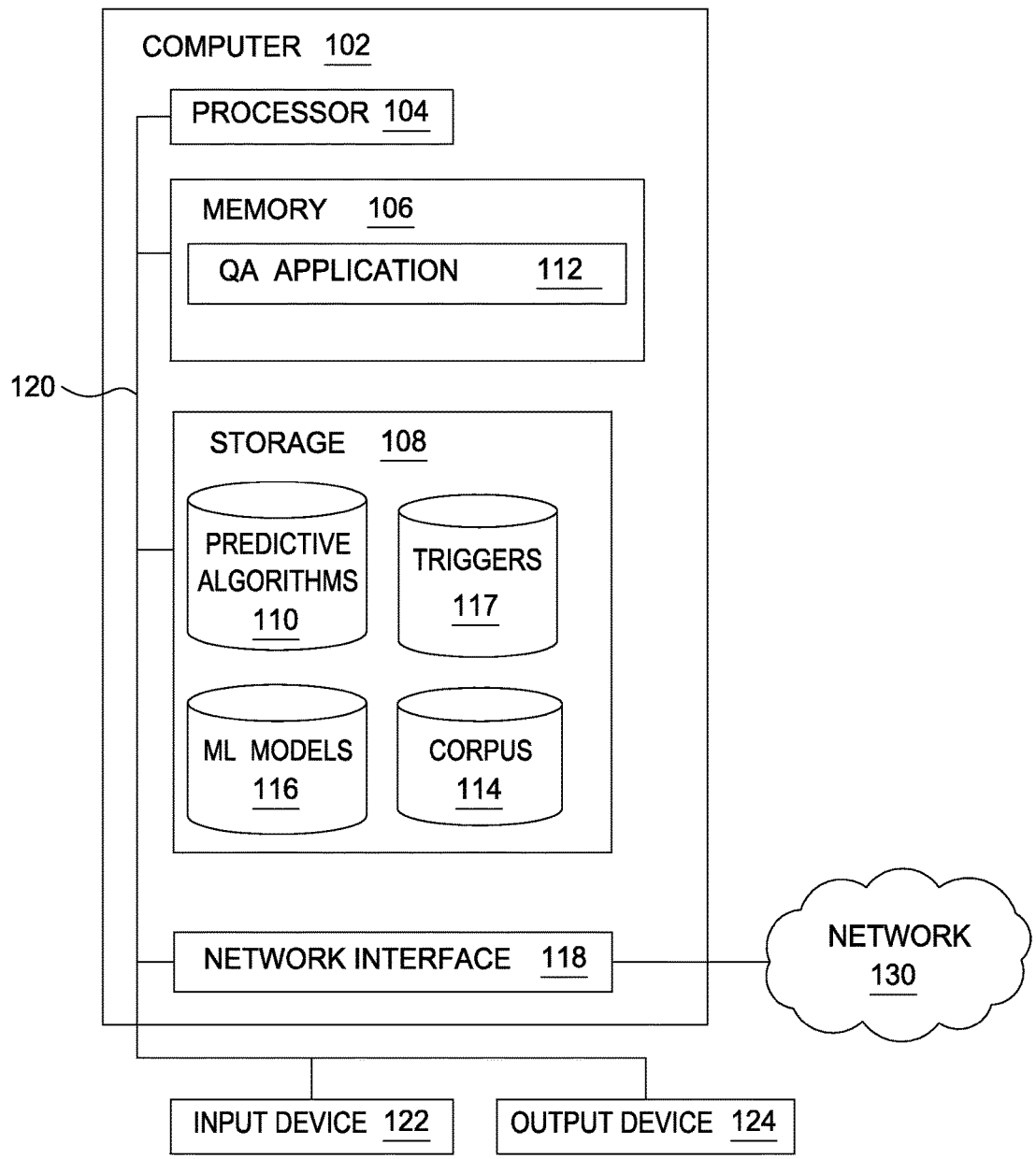
FIG. 1 depicts a system configured to dynamically generate candidate answers for speculative questions in a deep question answering system, according to one embodiment.

FIG. 1 depicts a system 100 configured to dynamically generate candidate answers for speculative questions in a deep question answering system, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains the QA application 112, which is an application generally configured to operate a deep question answering (QA) system. One example of a deep question answering system is Watson, by the IBM Corporation of Armonk, N.Y. A user may submit a case (also referred to as a question) to the QA application 112, which will then provide an answer to the case based on an analysis of a corpus of information 114. The QA application 112 may analyze the questions presented in the case to identify concepts in the question. Based on the questions, the QA application 112 may identify a number of candidate answers. The QA application 112 may then find supporting evidence for the candidate answers. The QA application 112 may then score and rank the candidate answers, merge the results, and present the best answer as its response to the case.

Additionally, the QA application 112 may be configured to answer speculative questions submitted by a user. A speculative question is a question that when submitted by the user has an unknown answer. For example, the user may ask "who will win the race between the tortoise and the hare?" Generally, the QA application 112 is configured to answer any type of speculative question. The speculative question need not be time-based, but lacks data that the QA application 112 can use to generate a response to the question at the time the question is received. For example, a user may ask "how many unique people will have registered after 1,000,000 accounts are created on a new website?" This question does not need a specified amount of time to elapse prior to knowing the outcome, however, the data will not be in the corpus at the time the user asks the question. However, if the corpus currently indicates that 7,000 unique people have registered for the first 10,000 accounts on the website, the QA application 112 may use this data to project an answer to the speculative question.

In order to answer the question, the QA application 112 may first determine that the question is speculative. To determine that the question is speculative, the QA application 112 may apply traditional question analysis techniques in the form of concept and semantic relation detection combined with verb tense annotators in order to identify a future tense in the question. Additionally, the QA application 112 may identify "independent variables" from the question in order to hone in on the appropriate type of prediction. The "independent variables" may be concepts that include, without limitation, time, prices, counts, populations, actions, and the like. Thus, the QA application 112 may understand whether or not the user mentioned a specific time (such as "in two months," "this season," "in 2015", etc.) together with the independent variables such as price or performance of an entity. Therefore, the QA application 112 may distinguish between whether the user is asking about the price of a commodity two months into the future versus two years into the future.

If the QA application 112 determines that a question is not speculative, the QA application 112 may process the question as usual. However, if the question is speculative, the QA application 112 may manufacture new candidate answers based on information gleaned while determining whether the question is speculative. Generally, since the corpus 114 does not contain the answers, the QA application 112 creates candidate answers via inference by searching for evidence in the corpus related to attributes of the question (such as the price of oil on a specific date 10 months in the future). The QA application 112 may use the attributes of the question to look up existing predictive algorithms in the predictive algorithms 110 (or the corpus 114). If the predictive algorithms stored in the predictive algorithms 110 need additional input data, the QA application 112 may gather the necessary data through question analysis and associated evidence retrieval in order to pass the additional input data to the selected algorithm.

The QA application 112 also has the ability to create new prediction algorithms (or models) "on the fly" based on attributes from the question and evidence gathered by searching the corpus 114. In such a scenario, the QA application 112 may use attributes from the question in order to gather and analyze past relevant evidence, looking for trends in order to infer an answer. In one embodiment, the QA application 112 only creates new prediction algorithms when no relevant prediction algorithms exist in the predictive algorithms 110.

Once the QA application 112 generates one or more candidate answers (the output of the selected predictive algorithms from the predictive algorithms 110), the QA application 112 scores each candidate answer, and returns the candidate answer with the highest score as being responsive to the question. In addition, the QA application 112 may register a trigger, stored in the triggers 117, which when fired, causes the QA application 112 to conduct a "post-mortem" analysis of the candidate answers generated in response to the speculative question. For example, if the user asks "will my favorite team win a championship within the next two years," the QA application 112 may register a trigger to fire at the expiration of the two year period (or to periodically detect whether the team wins a championship before the two year period expires). Once the QA application 112 knows the answer, the QA application 112 may score each candidate answer generated by the different predictive algorithms 110 used to answer the user's question. If the candidate answers generated by the algorithms are the correct answer (or close to the correct answer within some threshold), the QA application 112 may assign a higher confidence score to future candidate answers generated by the algorithms responsive to similar questions. Likewise, if the algorithms do not generate correct answers (or exceed an acceptable correctness threshold), the QA application 112 may assign a lower confidence score to future candidate answers generated by the algorithms responsive to similar questions. In either scenario, the confidence score may be for the algorithm, the candidate answers generated by the algorithms, or both. Additionally, the QA application 112 may use the "correct answer" in order to retain its machine learning models 116 that are referenced to generate candidate answers through traditional evidence gathering processes and/or predictive algorithm 110 selection decisions.

As shown, the storage 108 includes the predictive algorithms 110, a corpus 114, a machine learning (ML) models 116, and a triggers store 117. The predictive algorithms 110 may include one or more predictive algorithms (or models) that the QA application 112 may leverage in order to generate candidate answers to speculative questions. The predictive algorithms stored in the predictive algorithms 110 may be generated by the QA application 112, or by a different source (such as specialized industry-standard prediction models). For example, a predictive algorithm in the predictive algorithms 110 may be an industry-standard model that predicts consumer spending or the United States gross domestic product (GDP). The corpus 114 is a body of information used by the QA application 112 to generate answers to questions (also referred to as cases). For example, the corpus 114 may contain scholarly articles, dictionary definitions, encyclopedia references, and the like. The corpus 114 typically does not include answers to speculative questions, as the actual answers to these types of questions are typically unknown. Machine learning (ML) models 116 are models created by the QA application 112 during the training phase, which are used during a runtime pipeline to score and rank candidate answers to cases based on features previously generated for each answer. The triggers 117 include indications generated and stored by the QA application 112 to trigger a verification procedure by the QA application 112. The data included in the triggers 117 may include, without limitation, a triggering time, event, or other attribute of each speculative question, along with the candidate answer values generated by each predictive algorithm in the predictive algorithms 110.

Figure 2:
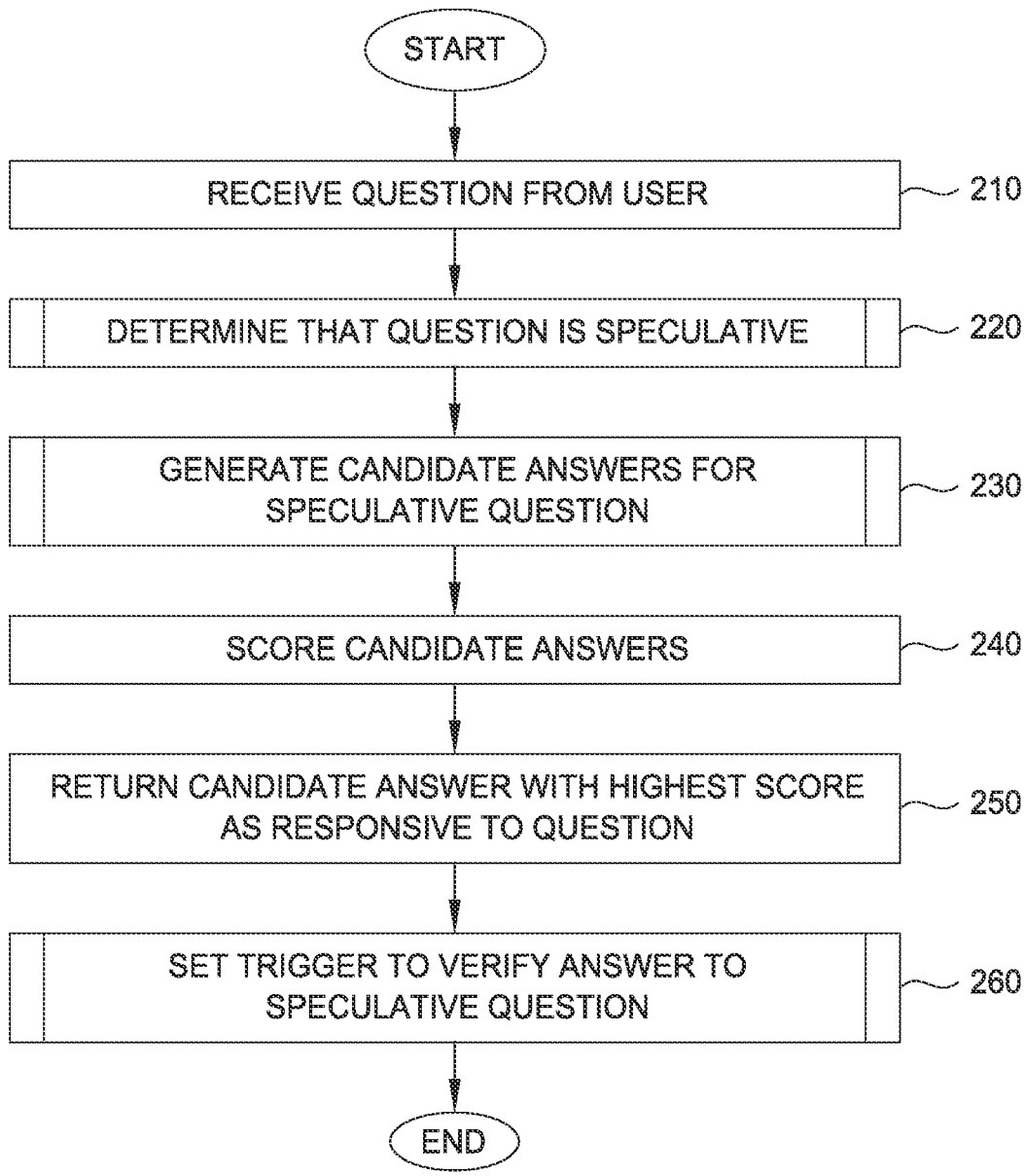
FIG. 2 is a flow chart illustrating a method to dynamically generate candidate answers for speculative questions in a deep question answering system, according to one embodiment.

FIG. 2 is a flow chart illustrating a method 200 to dynamically generate candidate answers for speculative questions in a deep question answering system, according to one embodiment. Generally, the steps of the method 200 allow a deep question answering system to answer "speculative" questions, or questions that do not have a known answer at the time asked by the user. In at least one embodiment, the QA application 112 performs the steps of the method 200. At step 210, the QA application 112 receives a question from a user. For example, the user may submit a question to the QA application 112 that asks "will it snow more than 5 times in Florida during the year 2088?" At step 220, described in greater detail with reference to FIG. 3, the QA application 112 may determine that the question received at step 210 is speculative. Generally, the QA application 112 may attempt to detect a future tense in the question text in order to determine that the question is speculative.

At step 230, described in greater detail with reference to FIG. 4, the QA application 112 may generate candidate answers for the speculative question. At step 240, the QA application 112 may score the candidate answers generated at step 240. In scoring the candidate answers, the QA application 112 may consider factors such as a confidence in the algorithms used to generate candidate answers, a confidence in whether the QA application 112 correctly identified the question being asked (stated differently, whether the QA application 112 made an error in interpreting the question), and a confidence in the machine learning models of the QA application 112. At step 250, the QA application 112 may return the candidate answer receiving the highest score as responsive to the question. At step 260, described in greater detail with reference to FIG. 5, the QA application 112 may set a trigger to which causes the QA application 112 to verify the answer to the speculative question once the correct answer is available. In verifying the answer, the QA application 112 may compare each candidate answer generated at step 230 to the correct answer. The QA application 112 may use the comparison results to update a confidence score in the predictive algorithms 110 generating the candidate answer, as well as to retrain the ML models 116.

Figure 3:
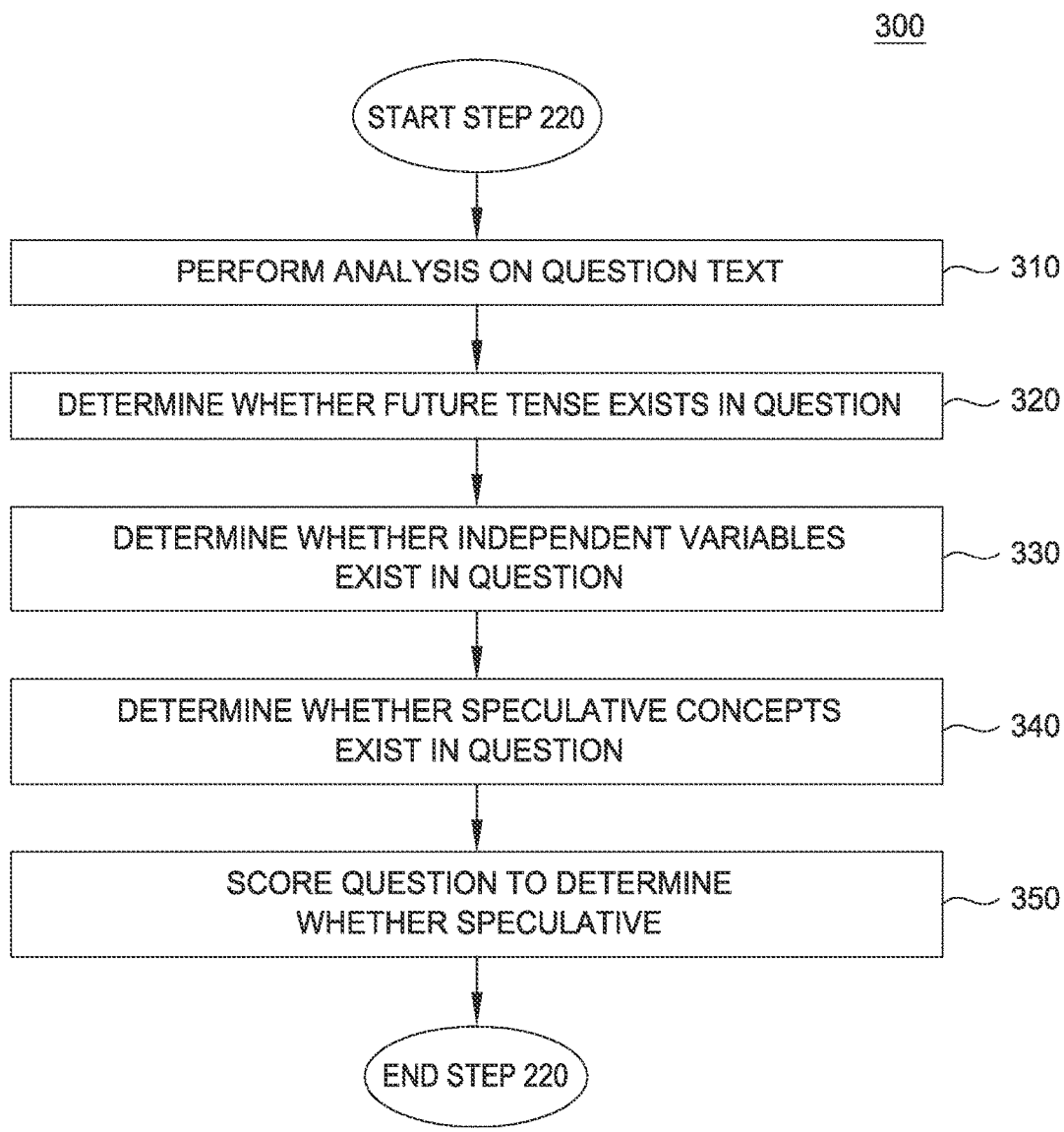
FIG. 3 is a flow chart illustrating a method to determine that a question is speculative, according to one embodiment.

FIG. 3 is a flow chart illustrating a method 300 corresponding to step 220 to determine that a question is speculative, according to one embodiment. In at least one embodiment, the QA application 112 performs the steps of the method 300. As previously indicated, a speculative question is a question that does not have a definite correct answer when asked by the user. Stated differently, in determining whether a question is speculative, the QA application 112 determines how likely it is that the question has an answer in the corpus 114. At step 310, the QA application 112 performs an analysis of the question text. In at least some embodiments, the analysis includes an analysis of the question text that is traditionally performed by the QA application 112 on all questions. For example, the traditional analysis may include, without limitation, concept detection, semantic relation detection, and verb tense annotators.

At step 320, the QA application 112 determines whether the future tense exists in the question. For example, if the question is "what will the price of corn be in 2 months," the QA application 112, using verb tense annotators, may identify the future tense in the portion of the question that reads "in 2 months." If the QA application 112 detects the future tense in the question, it is a strong indicator that the question is speculative. At step 330, the QA application 112 determines whether speculative independent variables exist in the question. The independent variables may include, without limitation, time, prices, counts, populations, and the like. In identifying independent variables, the QA application 112 may be more certain that the question is speculative. Furthermore, the independent variables may assist the QA application 112 in identifying the correct thrust of the question, such that the QA application 112 understands the type of prediction the question is asking for. Therefore, by identifying independent variables in the example above, the QA application 112 may be more certain that the user wants to know the price of corn in two months, and the QA application 112 may focus its search for supporting evidence in the corpus 114 based on this concept. At step 340, the QA application 112 determines whether speculative concepts exist in the question. For example, if the question asks "will it rain in New York," the QA application 112 may determine that the user wants to know what the weather will be like, which is necessarily a speculative concept, as the user is asking about weather in the future, even though the user did not specify a specific date or time. If the QA application 112 detects speculative concepts in the question, it may be more likely that the question is indeed speculative.

At step 350, the QA application 112 scores the question to determine whether the question is speculative. For example, the QA application 112 may weight one or more factors in computing a score for the question. If the score exceeds a speculative threshold, the QA application 112 may determine that the question is speculative. The QA application 112 may use, without limitation, one or more of the future tense, speculative concepts, and independent variables detected steps 320-340 in order to compute the score. The QA application 112 may weigh each of these attributes differently in order to score the question. If the QA application 112 determines that the question is speculative, the QA application 112 may inject additional candidate answers to its question answering pipeline, in addition to one or more existing non-speculative candidate answers to the question.

In addition, the QA application 112 may modify the scoring of candidate answers by a speculative score for the question. For example, if the QA application 112 is 20% confident that the question speculative, but 100% confident in a candidate answer to the speculative question, the QA application 112 may score the candidate answer as 20% confident due to the uncertainty that the question is speculative. As another example, the QA application 112 may be 100% confident that another question is speculative and 50% confident in the candidate answer to the question. In such a case, the QA application 112 may be 50% confident in the candidate answer. Generally, the QA application 112 may use any algorithm sufficient to account for its confidence level that the question is speculative when scoring candidate answers, including, without limitation, multiplying the confidence scores that the question is speculative and the candidate answer is correct.

Figure 4:
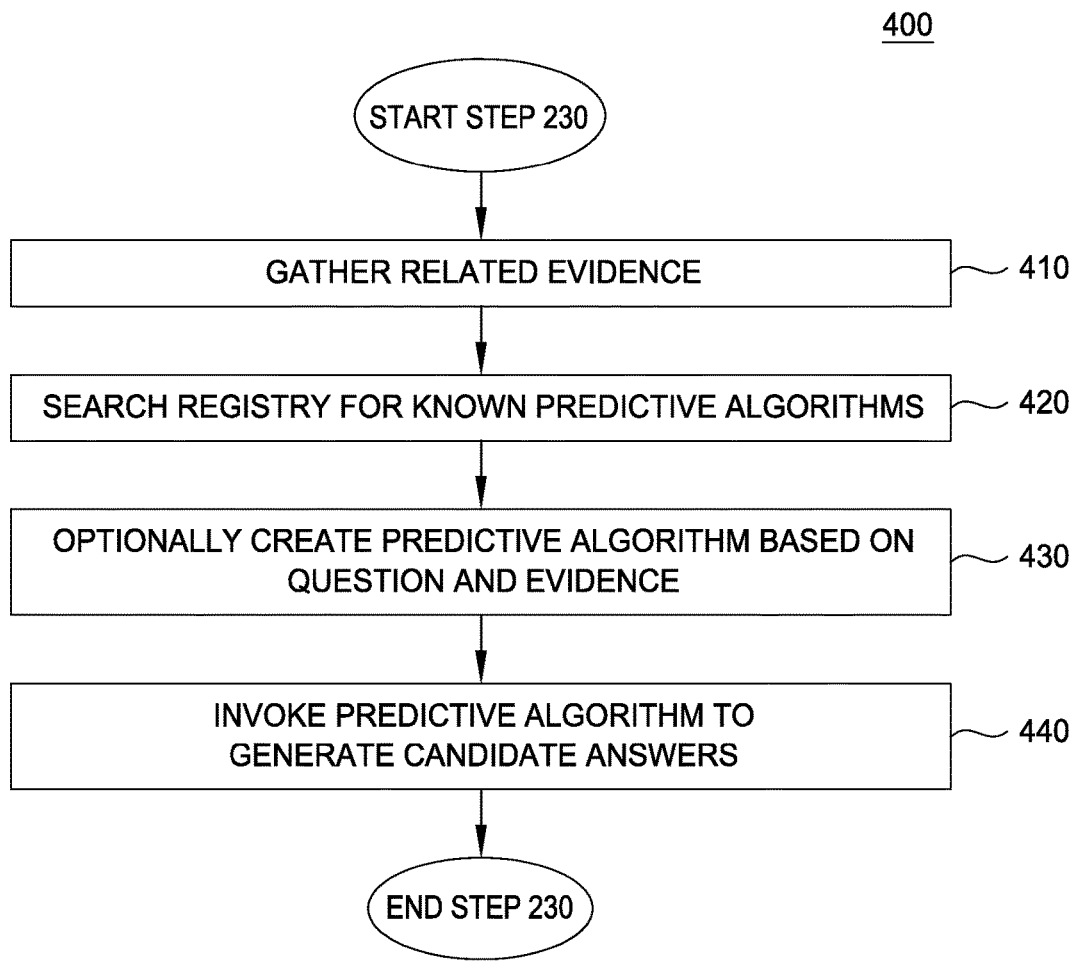
FIG. 4 is a flow chart illustrating a method to generate candidate answers for a speculative question, according to one embodiment.

FIG. 4 is a flow chart illustrating a method 400 corresponding to step 230 to generate candidate answers for a speculative question, according to one embodiment. In at least some embodiments, the QA application 112 executes the steps of the method 400. Because the QA application 112 has determined the question is speculative, and an answer is not included in the corpus 114, the QA application 112 executes the steps of the method 400 in order to dynamically create candidate answers through inference. At step 410, the QA application 112 gathers evidence from the corpus 114 related to the key attributes, variables and concepts identified in the question. At step 420, the QA application 112 searches the predictive algorithms 110 (and possibly the corpus 114) in order to identify existing predictive algorithms. For example, if the question asks the price of a thousand widgets in two months, the QA application 112 may search for algorithms that predict commodity prices, including widget prices, if such an algorithm is available in the predictive algorithms 110. The predictive algorithms 110 may be mostly self-contained in that one or more algorithms may be called with minimal additional input. For example, an algorithm for predicting future widget prices may know how to gather all the data it needs to generate an answer with only a small amount of input, such as a target date. Other algorithms in the predictive algorithms 110 may require input data that cannot be automatically retrieved. In such cases, the QA application 112 may compile the necessary input data through question analysis and associated evidence retrieval.

At step 430, the QA application 112 may optionally create predictive algorithms "on the fly" based on attributes from the question and evidence gathered from searching the corpus 114. The QA application 112 may concurrently generate the predictive algorithms while finding and invoking the existing algorithms from the predictive algorithms 110 in steps 420-430. The algorithms generated by the QA application 112 may be completely self-contained within the QA application 112, requiring little to no additional input data. The QA application 112 may use attributes from the question in order to gather and analyze past relevant evidence from the corpus 114, looking for trends in order to infer an answer. The algorithms generated by the QA application 112 provide a general purpose way of generating a candidate answer in the absence of any existing prediction algorithms relevant to the question in the predictive algorithms 110. Once generated, the QA application 112 may store the new algorithm in the predictive algorithms 110. At step 440, the QA application 112 may pass the required inputs and invoke the one or more of the predictive algorithms 110 in order to generate candidate answers. The candidate answers generated by each of the algorithms (existing or generated by the QA application 112) may be tailored to the question. For example, a first algorithm may return a candidate answer indicating that the price of one thousand widgets in 2 months will be $10, while a second algorithm may return a price of $11, and a third algorithm may return a candidate answer indicating that the price of one thousand widgets will rise by 5% relative to current prices. Generally, the candidate answer may take any form sufficient to be responsive to the speculative question.

Figure 5:
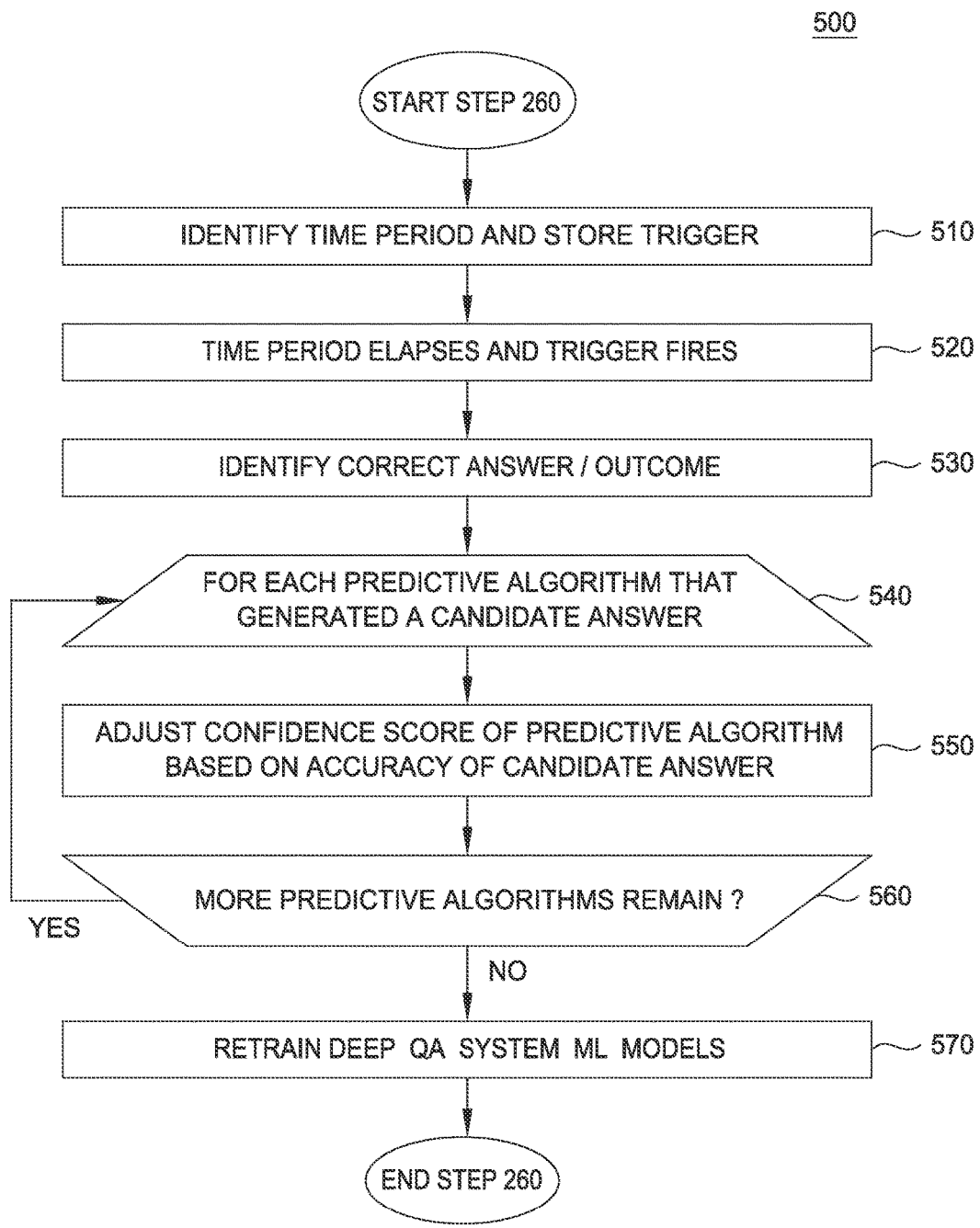
FIG. 5 is a flow chart illustrating a method to set a trigger to verify an answer to a speculative question, according to one embodiment.

FIG. 5 is a flow chart illustrating a method 500 corresponding to step 260 to set a trigger to verify an answer to a speculative question, according to one embodiment. In at least some embodiments, the QA application 112 performs the steps of the method 500. Generally, the steps of the method 500 allow the QA application 112 to verify whether previously generated candidate answers were accurate, adjust confidence scores in the predictive algorithms 110 generating the candidate answers, and adjust confidence scores in its own machine learning models 116. At step 510, the QA application 112 identifies a time period relevant to the speculative question and stores a trigger in the triggers 117. For example, if the question asks the price of corn in 6 months, the trigger may be set to fire in 6 months. However, the trigger need not be time based. For example, and without limitation, if the user wishes to know how many unique users correspond to the first million accounts on a website, the QA application 112 may set a trigger to monitor the website's account creation statistics. The QA application 112 may then periodically check the website account creation statistics until the website reaches one million created accounts. When storing the trigger, the QA application 112 may also store the different candidate answers for the question generated by the predictive algorithms as well as the QA application 112 for future comparison. At step 520, the time period elapses (or other condition is met), and the trigger is fired. At step 530, the QA application 112 identifies the correct answer or outcome of the question. For example, the QA application 112 may retrieve the current price of corn, or how many unique users created accounts out of the first million accounts on the website.

At step 540, the QA application 112 executes a loop including steps 550-560 for each predictive algorithm that generated a candidate answer. At step 550, the QA application 112 adjusts the confidence score of the current predictive algorithm based on the accuracy of the candidate answer generated by the predictive algorithm. The QA application 112 may use any feasible method to modify the confidence score of the predictive algorithm. For example, the QA application 112 may allocate additional confidence to the predictive algorithm if it predicted the correct answer (or the predicted answer was within a specified confidence threshold). Conversely, if the predictive algorithm did not predict the correct answer, or was in error beyond a reasonable threshold, the QA application 112 may reduce the confidence score of the predictive algorithm. In another embodiment, the QA application 112 may ranks the algorithms that produce the answer closest to the correct answer more highly, such that when the ML models 116 are retrained, they are considered more accurately predictive for future similar questions. At step 560, the QA application 112 determines whether more predictive algorithms remain. If more predictive algorithms remain, the QA application 112 returns to step 540. If no predictive algorithms remain, the QA application 112 proceeds to step 570, where the QA application 112 retrains the ML models 116. By retraining the ML models 116, the QA application 112 trains itself to make more accurate decisions on processing similar speculative questions in the future.

Advantageously, embodiments disclosed herein provide a deep question answering system the ability to answer speculative questions, even though an answer to the speculative questions are not found in a corpus of information traditionally used by the system to answer questions. Generally, the deep question answering system may identify a received question as speculative by detecting a future tense or other indicator of speculation. The deep question answering system may then generate candidate answers to the speculative questions based on one or more pre-existing predictive algorithms. The deep question answering system may also create one or more predictive algorithms to generate candidate answers in addition to (or in lieu of) the existing predictive algorithms. The deep question answering system may then score each candidate answer, and return the highest scoring candidate answer as responsive to the speculative question. In addition, the deep question answering system may conduct a subsequent verification of the correct answer to the speculative question by comparing the correct answer to the generated candidate answers at a later time. The verification process may allow the deep question answering system to adjust confidence scores in the predictive algorithms and retrain its own machine learning models.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the QA application 112 could execute on a computing system in the cloud and answer speculative questions. In such a case, the QA application 112 could generate candidate answers and store the candidate answers and a verification trigger at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
analyzing a text of a question received by a question answering system executing on a processor, wherein the question answering system uses a corpus of stored information comprising a plurality of electronic documents to generate answers, and wherein analyzing the text comprises identifying a future tense in the question;
determining, based on the analysis of the text of the question, that an answer to the question is not explicitly contained in the corpus of stored information;
upon determining that an answer to the question is not explicitly contained in the corpus, determining that the plurality of electronic documents in the corpus does not include a candidate answer for the question; and
upon determining that the plurality of electronic documents in the corpus does not include a candidate answer for the question:
determining that the question is speculative and cannot be answered definitively at a current time;
identifying, based on the analysis, an attribute of the question, wherein the attribute of the question relates to a desired response to the question;
generating, by one or more predictive algorithms executing on the processor, a plurality of candidate answers for the question based on the identified attribute of the question, wherein each of the one or more predictive algorithms are used to generate estimated future values for the attribute of the question;
computing a respective score for each candidate answer of the plurality of candidate answers; and
returning, by the question answering system executing on the processor, a first candidate answer, of the plurality of candidate answers, as responsive to the speculative question received by the question answering system.

2. The computer-implemented method of claim 1, wherein the plurality of candidate answers are not in the corpus of information prior to being generated, the method further comprising:
determining, based on the analysis of the text of the question, a future time at which an actual answer to the speculative question will be available;
storing an indication specifying to verify an accuracy of each candidate answer of the plurality of candidate answers at the future time; and
upon determining that the future time has arrived:
determining the actual answer to the speculative question, wherein the actual answer definitively answers the speculative question based on new information;
comparing each candidate answer of the plurality of candidate answers to an actual answer to the question to determine an accuracy of each candidate answer;
adjusting a confidence score reflecting an ability of the question answering system to generate candidate answers; and
adjusting a confidence score of the predictive algorithm that generated the respective candidate answer of the plurality of candidate answers based on the accuracy of each respective candidate answer.

3. The computer-implemented method of claim 1, wherein determining that the question is speculative further comprises:
 analyzing the text of the question to identify an independent variable in the question, wherein the independent variable corresponds to at least one of a time, a price, a count, or a population;
 computing a score for the question, wherein the score is of a plurality of score values and reflects a likelihood that the question is speculative; and
 determining that the score exceeds a predefined threshold.

4. The computer-implemented method of claim 1, wherein generating the plurality of candidate answers comprises:
 collecting relevant evidence from the text of the electronic documents stored in the corpus of information;
 selecting the one or more predictive algorithms from the corpus; and
 applying the one or more predictive algorithms to the relevant evidence and at least one attribute of the question to generate the plurality of candidate answers, wherein each of the plurality of candidate answers includes an estimated value for the attribute of the question.

5. The computer-implemented method of claim 1, further comprising:
 computing a confidence score of an analysis of the question and supporting evidence gathered from the corpus of information based on the analysis of the question, wherein the confidence score of the analysis of the question indicates a level of confidence in the determination that the question is speculative; and
 adjusting the score of each candidate answer based on the computed confidence score.

6. The computer-implemented method of claim 1, wherein the one or more predictive algorithms are further selected from a set of two or more existing predictive algorithms.

7. The computer-implemented method of claim 1, wherein at least one of the one or more predictive algorithms is generated by the question answering system based on: (i) at least one attribute of the question, (ii) relevant evidence gathered from the corpus of information, (iii) one or more trends found in the corpus of information.

8. A computer-implemented method, comprising:
 analyzing a text of a question received by a question answering system executing on a processor, wherein the question answering system uses a corpus of stored information comprising a plurality of electronic documents to generate answers, and wherein analyzing the text comprises identifying: (i) a future tense in the text of the question, and (ii) a concept corresponding to an independent variable in the question;
 determining, based on the identified future tense and concept corresponding to the independent variable, that an answer to the question is not explicitly contained in the corpus of information;
 upon determining that an answer to the question is not explicitly contained in the corpus, determining that the corpus does not include a candidate answer for the question; and
 upon determining that the corpus does not include a candidate answer for the question:
  determining that the question is speculative and cannot be answered definitively at a current time;
  identifying, based on the analysis, an attribute of the question, wherein the attribute of the question relates to a desired response to the question;
  upon determining that a predictive algorithm related to the independent variable does not exist, generating a first predictive algorithm based on the identified attribute of the question, wherein the first predictive algorithm is used to generate estimated future values for the attribute of the question;
  generating, by the first predictive algorithm executing on the processor, a plurality of candidate answers for the question based on the attribute;
  computing a respective score for each candidate answer of the plurality of candidate answers; and
  returning, by the question answering system executing on the processor, a first candidate answer, of the plurality of candidate answers, as responsive to the question.

9. The computer-implemented method of claim 8, wherein the first predictive algorithm is further generated based on relevant evidence gathered from the corpus of information and one or more trends found in the corpus of information.

10. The computer-implemented method of claim 9, further comprising:
 determining, based on the analysis of the text of the question, a future time at which an actual answer to the speculative question will be available;
 storing an indication specifying to verify an accuracy of each candidate answer at the future time; and
 upon determining that the future time has arrived:
  determining the actual answer to the speculative question, wherein the actual answer definitively answers the speculative question based on new information;
  comparing each candidate answer of the plurality of candidate answers to an actual answer to the question to determine the accuracy of each candidate answer;
  adjusting a confidence score of an ability of the question answering system to generate the plurality of candidate answers; and
  adjusting a confidence score of the first predictive algorithm based on the accuracy of each respective candidate answer.

* * * * *